United States Patent
Rodriguez

(10) Patent No.: US 12,164,619 B1
(45) Date of Patent: Dec. 10, 2024

(54) METHODS AND SYSTEMS FOR ENHANCING DETECTION OF FRAUDULENT DATA

(71) Applicant: Daon Technology, Douglas (IM)

(72) Inventor: Raphael A Rodriguez, Marco Island, FL (US)

(73) Assignee: Daon Technology, Douglas (IM)

( * ) Notice: Subject to any disclaimer, the term of this patent is extended or adjusted under 35 U.S.C. 154(b) by 0 days.

(21) Appl. No.: 18/441,823

(22) Filed: Feb. 14, 2024

(51) Int. Cl.
  *G06F 21/00* (2013.01)
  *G06F 21/32* (2013.01)
  *G10L 17/04* (2013.01)
  *G10L 17/06* (2013.01)

(52) U.S. Cl.
  CPC .............. *G06F 21/32* (2013.01); *G10L 17/04* (2013.01); *G10L 17/06* (2013.01)

(58) Field of Classification Search
  None
  See application file for complete search history.

(56) References Cited

U.S. PATENT DOCUMENTS

| | | | |
|---|---|---|---|
| 11,810,401 B1* | 11/2023 | Rodriguez | G06V 40/53 |
| 2019/0385256 A1* | 12/2019 | Nahamoo | G06Q 10/0635 |
| 2022/0121868 A1* | 4/2022 | Chen | G06F 18/22 |
| 2022/0254350 A1* | 8/2022 | Guo | G10L 17/02 |
| 2022/0328050 A1* | 10/2022 | Hennig | G10L 17/24 |
| 2024/0096051 A1* | 3/2024 | Gopalakrishna | G06V 40/23 |
| 2024/0127824 A1* | 4/2024 | Wexler | G10L 17/18 |

* cited by examiner

*Primary Examiner* — Jeffery L Williams
(74) *Attorney, Agent, or Firm* — Kevin McDermott, Esq.

(57) ABSTRACT

A method for enhancing detection of fraudulent data is provided that includes the step of analyzing, by an electronic device, voice biometric data captured while the user was speaking to determine whether the captured voice biometric data exhibits anomalies associated with fraudulent voice audio data. Moreover, the method includes the steps of analyzing circumstances under which the voice biometric data was captured, analyzing mannerisms of the user while the voice biometric data was captured, and calculating a risk score based on at least the results of the analyses. Furthermore, the method includes the steps of comparing the risk score against a threshold value, and in response to determining the risk score fails to satisfy the threshold value generating an alert having a risk level corresponding to the risk score.

6 Claims, 4 Drawing Sheets

50 →

| 52 RISK SCORE | 54 RISK LEVEL |
|---|---|
| 0.00 to 0.33 | LOW |
| 0.34 to 0.66 | MEDIUM |
| 0.67 to 1.00 | HIGH |

| 54 RISK LEVEL | 58 ALERT |
|---|---|
| LOW | NO IMMEDIATE ACTION |
| MEDIUM | AUTOMATED REVIEW OR LOW PRIORITY MANUAL REVIEW |
| HIGH | HIGH PRIORITY |

FIG. 5

METHODS AND SYSTEMS FOR ENHANCING DETECTION OF FRAUDULENT DATA

BACKGROUND OF THE INVENTION

This invention relates generally to fraudulent data, and more particularly, to methods and systems for enhancing detection of fraudulent data.

In the realm of digital communications, the security landscape is rapidly evolving, marked by an increasing sophistication in synthetic voice and identity fraud techniques. Artificial intelligence and machine learning technologies have enabled malicious actors to create and deploy realistic and accurate fraudulent synthetic voice and identity data. As a result, malicious actors are becoming increasingly capable of accurately mimicking human behavioral patterns, making them a potent tool for perpetrating fraud, impersonation, and other malicious activities.

It is known that voice watchlist systems have been used in identifying and mitigating risks associated with unauthorized voice access or fraudulent activities. Voice watchlist systems typically maintain a repository of user voice data. These systems generally compare identity data and voice data captured during an authentication transaction against the corresponding data in the repository to flag potential mismatches, or efforts to deceive an authenticating entity into concluding that a malicious actor is the person they claim to be. Such impersonations are known as spoofing.

However, the effectiveness of known voice watch list systems is waning because they are designed to identify and respond to known threats and generally are unable to adapt to the nuanced and evolving nature of synthetic voice and identity fraud perpetuated by malicious actors. Moreover, such systems are not typically known to adequately analyze behavioral patterns associated with voice interactions and thus do not capture clues that could indicate fraudulent activity. Furthermore, such known systems may struggle to scale effectively given the proliferation of digital communications platforms which could cause lapses in monitoring and delayed processing times. As a result, the inconvenience resulting from, and the costs incurred due to spoofing attacks are rapidly increasing.

Thus, it would be advantageous and an improvement over the relevant technology to provide a method and a system capable of adapting to the nuanced and evolving nature of synthetic voice and identity fraud, analyzing behavioral patterns associated with voice interactions, and scaling effectively to accommodate the proliferation of digital communications to facilitate a reduction in costs incurred and user inconvenience due to successful spoofing attacks.

BRIEF DESCRIPTION OF THE INVENTION

An aspect of the present disclosure provides a method for enhancing detection of fraudulent data including the steps of analyzing, by an electronic device, voice biometric data captured while the user was speaking to determine whether the captured voice biometric data exhibits anomalies associated with fraudulent voice biometric data. Moreover, the method includes the steps of analyzing circumstances under which the voice biometric data was captured, analyzing mannerisms of the user while the voice biometric data was captured, calculating a risk score based on at least the results of said analyzing steps, and comparing the risk score against a threshold value. In response to determining the risk score fails to satisfy the threshold value, the method includes a step of generating an alert having a risk level corresponding to the risk score. The multimedia data is fraudulent and prompts the user to cease viewing the multimedia data.

In an embodiment of the present disclosure, the analyzing mannerisms step includes at least one of: assessing the captured voice biometric data for rhythms; assessing the captured voice biometric data for intonations; assessing the captured voice biometric data for timing; and assessing the captured voice biometric data for interaction sequences.

In another embodiment of the present disclosure, the generating an alert step includes determining a risk level for the risk score and determining an alert for the risk level.

In yet another embodiment of the present disclosure, a machine learning model is used to conduct the analyzing voice biometric data step, the analyzing circumstances step, and the analyzing mannerisms step, and the method further includes the step of updating the machine learning model using data from authentication transactions conducted with the same and different users.

In another embodiment of the present disclosure, the method further includes the steps of calculating a risk score for each of a plurality of other authentication transactions, generating an alert for each calculated risk score, prioritizing the alerts based on the risk scores, and allocating security resources according to the prioritizing step.

In another embodiment of the present disclosure, wherein the generated alerts indicate the captured voice biometric data requires manual review or the captured voice biometric data is fraudulent.

In another embodiment of the present disclosure, the method further includes storing the captured voice biometric data and the results of each analyzing step in a database, analyzing the stored data and updating the correspondence between alerts and risk scores based on the analyzing the stored data step.

In another embodiment of the present disclosure, wherein the database includes a decentralized database employing blockchain technology.

In another embodiment of the present disclosure, the method further includes analyzing the captured voice biometric data for background noise and categorizing background noise.

In another embodiment of the present disclosure, the method further includes dynamically adjusting the threshold value based on historical data trends, anomaly detection accuracy, and user feedback.

Another aspect of the present disclosure provides an electronic device for enhancing detection of fraudulent data including a processor and a memory configured to store data. The electronic device is associated with a network and the memory is in communication with the processor and has instructions stored thereon which, when read and executed by the processor, cause the electronic device to analyze voice biometric data captured while the user was speaking to determine whether the voice biometric data exhibits anomalies associated with fraudulent voice biometric data. The instructions which, when read and executed by the processor, further cause the electronic device to analyze circumstances under which the voice biometric data was captured, analyze mannerisms of the user while the voice biometric data was captured, calculate a risk score based on at least the results of the analyses, and compare the risk score against a threshold value. In response to determining the risk score fails to satisfy the threshold value, the instructions which, when read and executed by the processor further cause the electronic device to generate an alert having a risk level corresponding to the risk score.

In an embodiment of the present disclosure, the instructions when read and executed by the processor, further cause the electronic device to analyze the mannerisms by assessing at least one of the captured voice biometric data for rhythms, the captured voice biometric data for intonations, the captured voice biometric data for timing, and the captured voice biometric data for interaction sequences.

In an embodiment of the present disclosure, the instructions when read and executed by the processor, further cause the electronic device to determine a risk level for the risk score and determine the alert for the risk level.

In an embodiment of the present disclosure, wherein a machine learning model is used to analyze captured voice biometric data, analyze the circumstances, and analyze the mannerisms, and the instructions when read and executed by said processor, further cause said electronic device to update the machine learning model using data from authentication transactions conducted with the same and different users.

In an embodiment of the present disclosure, wherein the instructions when read and executed by the processor, further cause the electronic device to calculate a risk score for each of a plurality of other authentication transactions, generate an alert for each calculated risk score, prioritize the alerts based on the risk scores, and allocate security resources according to priority.

In an embodiment of the present disclosure, wherein the generated alerts indicate the captured voice biometric data requires manual review or the captured voice biometric data is fraudulent.

In an embodiment of the present disclosure, the instructions when read and executed by said processor, further cause the electronic device to store the captured voice biometric data, the results of the voice biometric data analysis, the results of the circumstance analysis, and the results of the mannerism analysis in a database. The instructions when read and executed by said processor, further cause the electronic device to analyze the stored data and update the correspondence between alerts and risk scores based on the analysis of the stored data.

In an embodiment of the present disclosure, wherein the database includes a decentralized database employing blockchain technology.

In an embodiment of the present disclosure, wherein the instructions when read and executed by the processor, further cause the electronic device to analyze the captured voice biometric data for background noise and categorize the background noise.

In an embodiment of the present disclosure, wherein the instructions when read and executed by the processor, further cause the electronic device to dynamically adjust the threshold value based on historical data trends, anomaly detection accuracy, and user feedback.

BRIEF DESCRIPTION OF THE DRAWINGS

FIG. 4 is a diagram illustrating example risk scores and corresponding risk levels;

FIG. 5 is a diagram illustrating the example risk levels as shown in FIG. 4 and corresponding example alerts.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
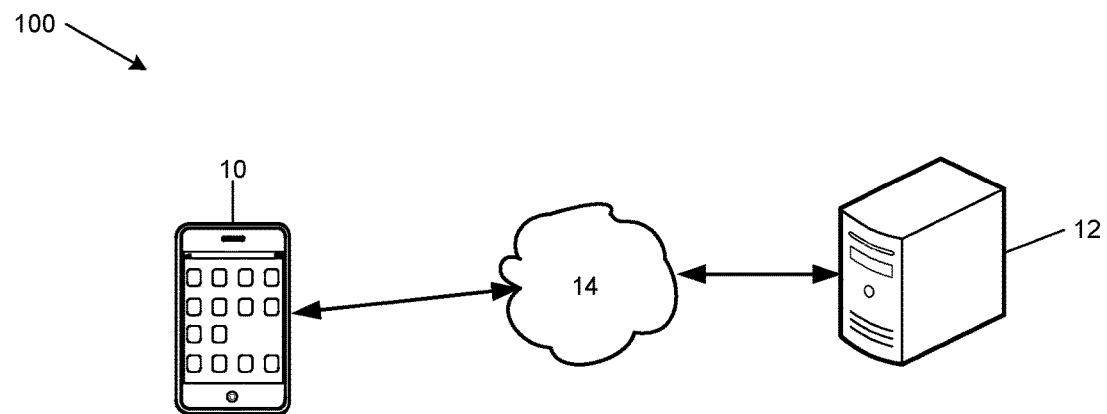
FIG. 1 is a schematic diagram of an example computing system for enhancing detection of fraudulent data according to an embodiment of the present disclosure.

FIG. 1 is a schematic diagram of an example computing system 100 for enhancing detection of fraudulent data captured remotely during, for example, an authentication transaction according to an embodiment of the present disclosure. As shown in FIG. 1, the main elements of the system 100 include an electronic device 10 and a server 12 communicatively connected via a network 14.

In FIG. 1, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device included in the system 100. Moreover, the electronic device 10 may alternatively be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC).

The electronic device 10 may be associated with a single person who operates the device. The person who is associated with and operates the electronic device 10 is referred to herein as a user.

The server 12 can be, for example, any type of server or computer implemented as a network server or network computer. The electronic device 10 and server 12 may alternatively be referred to as information systems. The server 12 may also alternatively be referred to as an electronic device.

The network 14 may be implemented as a 5G communications network. Alternatively, the network 14 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 14 may also be any type of wired network or a combination of wired and wireless networks.

It is contemplated by the present disclosure that the number of electronic devices 10 and servers 12 is not limited to the number shown in the system 100. Rather, any number of electronic devices 10 and servers 12 may be included in the system 100.

Figure 2:
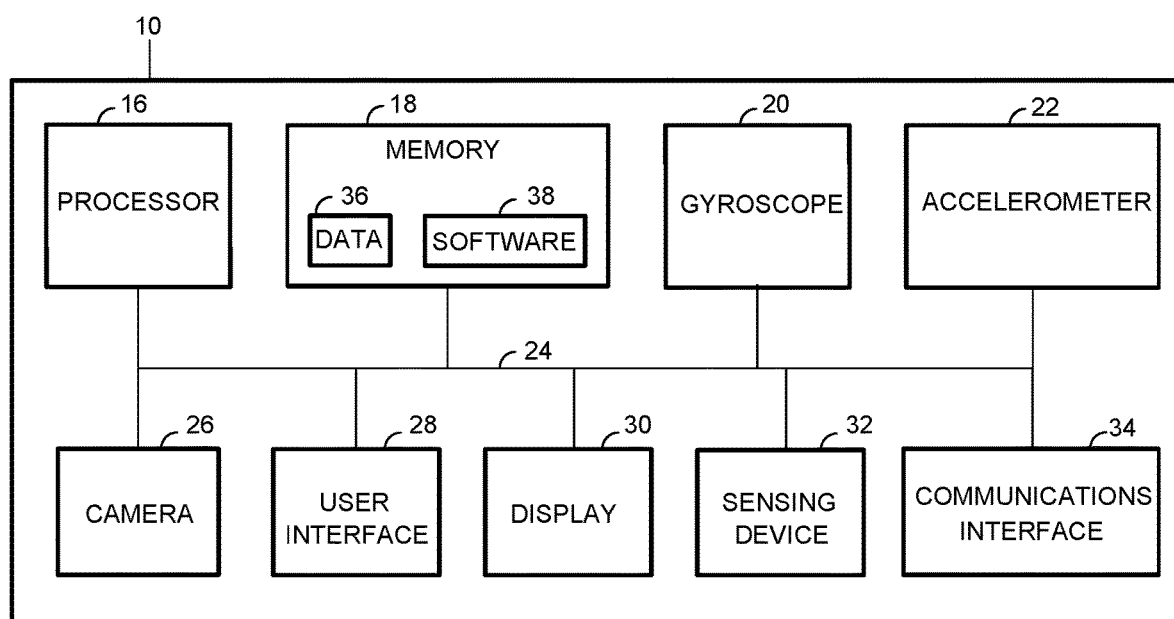
FIG. 2 is a more detailed schematic diagram illustrating an example electronic device in the system of FIG. 1.

FIG. 2 is a more detailed schematic diagram illustrating the example electronic device 10 used for enhancing detection of fraudulent data captured remotely during, for example, an authentication transaction according to an embodiment of the present disclosure. The electronic device 10 includes components such as, but not limited to, one or more processors 16, a memory 18, a gyroscope 20, one or more accelerometers 22, a bus 24, a camera 26, a user interface 28, a display 30, a sensing device 32 and a communications interface 34. General communication between the components in the electronic device 10 is provided via the bus 24.

In FIG. 2, the electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that capable of communicating with the electronic device 10. For example, the electronic device 10 may be any type of server or computer implemented as a network server or network computer. Other examples of the electronic device 10 include, but are not limited to, a cellular phone, any wireless hand-held consumer electronic device, a smart phone, a tablet computer, a phablet computer, a laptop computer, and a personal computer (PC). It is contemplated by the present disclosure that the electronic device 10 may not include some components, for example, the gyroscope 20 and accelerometer 22 in some embodiments.

The processor 16 executes software instructions, or computer programs, stored in the memory 18. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 18 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 18 may be used to store any type of data 36, for example, data records of users. Each data record is typically for a respective user. The data record for each user may include data such as, but not limited to, data captured during authentication transactions, biometric templates, personal data, the results of voice biometric data analyses and authentication transaction results, the results of circumstance analyses, and the results of mannerism analyses. Data captured during authentication transactions may include, but is not limited to, biometric modality data, data regarding the context in which the biometric modality data was captured, data regarding mannerisms exhibited by users during capture, and various speech characteristics in captured voice biometric data. A biometric template can be any type of mathematical representation of biometric modality data. Biometric modality data is the data of a biometric modality of a person. For the methods and systems described herein, the biometric modality is voice.

The memory 18 may be considered a database. It is contemplated by the present disclosure that the database may alternatively be implemented as a decentralized database employing blockchain technology. Such an alternative implementation would store the same data as described herein for the memory 18.

Voice biometric data may be captured by the electronic device 10 by recording a user speaking a phrase. The phrase may be secret. Captured voice biometric data may be temporarily or permanently stored in the electronic device 10 or in any device capable of communicating with the electronic device 10 via the network 14. Voice biometric data is captured as audio data. Audio signals are audio data. The audio data is stored as an audio data file. As used herein, capture means to record temporarily or permanently, any data including, for example, voice biometric data of a person while speaking. Stored captured voice biometric data and stored biometric templates may be referred to as record voice biometric data.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 18 can be used to store any type of software 38. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, authentication applications, feature extraction computer programs, machine learning algorithms (MLA), machine learning models, and any other software and/or any type of instructions associated with algorithms, processes, or operations for controlling the general functions and operations of the electronic device 10. The software may also include computer programs that implement buffers and use RAM to store temporary data.

Authentication applications enable the electronic device 10 to conduct user verification and identification (1:N) transactions with any type of authentication data, where "N" is a number of candidates.

A machine learning algorithm (MLA) may be trained to create a machine learning model for enhancing prediction of potential security threats that may be present during authentication transactions, analyzing the context of an authentication transaction, analyzing the mannerisms of users during the transactions, analyzing various speech characteristics of captured voice biometric data, and generating a risk score for each authentication transaction. Machine learning models have parameters which are modified during training to optimize functionality of the models trained using a machine learning algorithm (MLA). The machine learning model may be retrained using data captured during authentication transactions. MLAs include at least classifiers and regressors. Example classifiers are Deep Neural Networks, Time Delay Neural Networks, Recurrent Neural Networks, Residual Networks, and Generative Adversarial Networks.

The process of verifying the identity of a user is known as a verification transaction. Typically, during a verification transaction based on voice biometric data, a verification template is generated from a spoken identification verification phrase captured during the transaction. The verification template is compared against a corresponding recorded enrolment template of the user and a score is calculated for the comparison. The recorded enrolment template is created during enrolment of the user in an authentication system. If the calculated score is at least equal to a threshold score, the identity of the user is verified as true. Alternatively, the captured voice biometric data may be compared against the corresponding record voice biometric data to verify the identity of the user.

Biometric modality data may be captured in any manner. For example, for voice biometric data the electronic device 10 may record a user speaking. Captured biometric modality data may be temporarily or permanently stored in the electronic device 10 or in any device in the system 100 capable of communicating with the electronic device 10. Alternatively, the biometric modality data may not be stored.

The gyroscope 20 and the one or more accelerometers 22 generate data regarding rotation and translation of the electronic device 10 that may be communicated to the processor 16 and the memory 18 via the bus 24. The gyroscope 20 and accelerometer 22 are typically included in electronic devices 10 that are primarily mobile, for example, smart phones and other smart devices, but not in electronic devices 10 that are primarily stationary, for example, servers or personal computers. Thus, the electronic device 10 may alternatively not include the gyroscope 20 or the accelerometer 22 or may not include either.

The camera 26 captures image data. The camera 26 may be integrated into the electronic device 10 as one or more front-facing cameras and/or one or more rear facing cameras that each incorporates a sensor, for example and without limitation, a CCD or CMOS sensor.

The user interface 28 and the display 30 allow interaction between a user and the electronic device 10. The display 30 may include a visual display or monitor that displays information. For example, the display 30 may be a Liquid Crystal Display (LCD), an active matrix display, plasma display, or cathode ray tube (CRT). The user interface 28 may include a keypad, a camera, a keyboard, a mouse, an illuminator, a signal emitter, at least one microphone, for example, dual microphones, and/or speakers. The microphone may be used to capture voice biometric data of a user while speaking during, for example, an authentication transaction.

Moreover, the user interface 28 and the display 30 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 28 communicates this change to the processor 16 and settings can be changed, or user entered information can be captured and stored in the memory 18.

The sensing device 32 may include Radio Frequency Identification (RFID) components or systems for receiving information from other devices (not shown) and for transmitting information to other devices. The sensing device 32 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 34 may include various network cards, and circuitry implemented in software and/or hardware to enable wired and/or wireless communications with other devices (not shown). Communications include, for example, conducting cellular telephone calls and accessing the Internet over a network. By way of example, the communications interface 34 may be a digital subscriber line (DSL) card or modem, an integrated services digital network (ISDN) card, a cable modem, or a telephone modem to provide a data communication connection to a corresponding type of telephone line. As another example, the communications interface 34 may be a local area network (LAN) card (e.g., for Ethernet™ or an Asynchronous Transfer Model (ATM) network) to provide a data communication connection to a compatible LAN. As yet another example, the communications interface 34 may be a wire or a cable connecting the electronic device 10 with a LAN, or with accessories such as, but not limited to, other electronic devices. Further, the communications interface 34 may include peripheral interface devices, such as a Universal Serial Bus (USB) interface, a PCMCIA (Personal Computer Memory Card International Association) interface, and the like.

The communications interface 34 also allows the exchange of information across the network 14 between the electronic device 10 and any other device (not shown). The exchange of information may involve the transmission of radio frequency (RF) signals through an antenna (not shown). Moreover, the exchange of information may be between the electronic device 10, the server 12, the computer 14, other electronic devices (not shown), and other computer systems (not shown) capable of communicating over the network 16.

Examples of other computer systems (not shown) include computer systems of service providers such as, but not limited to, financial institutions, medical facilities, national security agencies, merchants, and authenticators. The electronic devices (not shown) may be associated with any user or with any type of entity including, but not limited to, commercial and non-commercial entities.

The server 12 includes most of the same components as described herein for the electronic device 10. However, because the server 12 is primarily stationary, not primarily mobile, the server 12 may not include the gyroscope 20 and/or the accelerometer 22.

Figure 3:
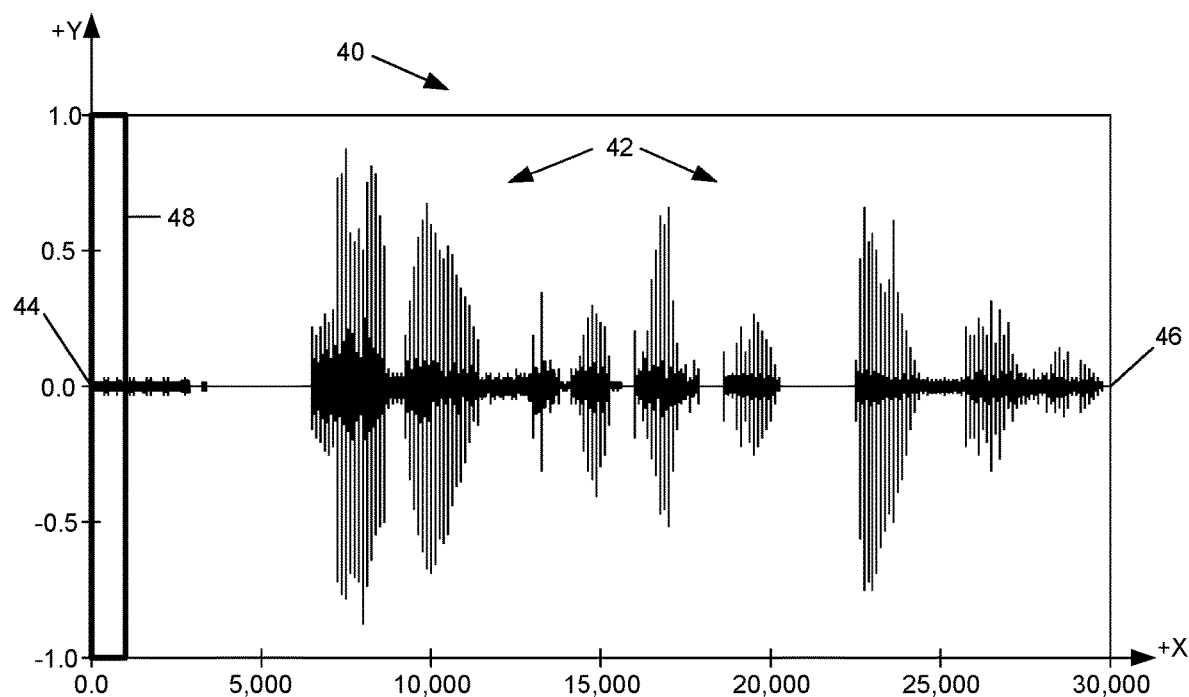
FIG. 3 is a diagram illustrating an example audio signal captured by the electronic device while a user spoke a phrase.

FIG. 3 is a diagram 40 illustrating an example audio signal 42 captured by the electronic device 10 while a user spoke a phrase. The audio signal 42 may be captured by the electronic device 10 while it is operated by the user or another person. The audio signal 42 is audio data that represents captured voice biometric data of the user. The audio signal 42 may be stored in the data record of the user associated with the electronic device 10. The audio signal 42 and a template generated therefrom may be referred to as record audio data.

The audio signal 42 is plotted on a Cartesian coordinate system having X and Y-axes. The X-axis represents the number of discrete elements included in the captured audio signal 42 in which each discrete element is captured at a rate, in seconds, equal to the inverse of a sampling frequency. The Y-axis represents the normalized values of the discrete elements of the signal 42. Alternatively, the Y-axis may represent the actual values of the discrete elements in the signal 42. The audio signal 42 extends from the origin 44 to a terminus 46 and has a duration of about three (3) seconds. The duration of the audio signal 42 depends on the length of the spoken phrase which may also vary.

A temporal window 48 is located in an initial position flush with the origin 44 and has a duration of twenty-five (25) milliseconds. Alternatively, the temporal window 48 may be any duration. The window 48 is translated in the positive direction along the X-axis over the duration of the signal 42 in ten (10) millisecond increments. The window 48 can be implemented as a mathematical function that multiples the audio signal 42 by a window function.

Generally, a phrase spoken by a user can be referred to as an utterance. Example phrases include but are not limited to, "My voice is my password, verify me" and "I have several busy children, verify me." Alternatively, a phrase may be a single letter or number, a group of letters or numbers, any combination of letters and numbers, or one or more sentences. Any phrase may be spoken to generate the audio signal 42.

A machine learning model trained to analyze data associated with voice authentication transactions may be used to predict possible security threats. The machine learning model may be trained to detect anomalies and recognize patterns indicative of synthetic voice manipulation or other fraudulent manipulation. More specifically, the machine learning model may analyze voice features, interaction sequences and behavioral cues to identify inconsistencies or irregularities in the data that diverges from established patterns.

The machine learning model may be trained using data such as, but not limited to, voice data captured during authentication transactions, known fraud patterns encountered in previous authentication transactions, and existing and future synthetic voice generation techniques. During authentication transactions, the model may analyze captured voice biometric data that exhibits patterns or anomalies that indicate the captured voice biometric may have been generated using synthetic speech techniques.

The machine learning model may also be trained to analyze the subtleties of voice interaction patterns by scrutinizing, for example, the context and mannerisms of users during authentication transactions. More specifically, the machine learning model may be trained to assess various aspects of speech such as, but not limited to, the tone, pitch, rhythm, speed and volume of speech typically uttered during authentication transactions. The electronic device 10 stores captured voice biometric data for each user which can be analyzed to determine typical speech patterns for respective users.

Various aspects of voice biometric data captured from a user during an authentication transaction may be assessed and compared against the same aspects of record voice biometric data of the user. Differences between the various aspects may indicate stress, hesitation or other emotions inconsistent with typical behavior of the user. Such results may indicate that the captured voice biometric data is fraudulent.

Rhythm as described herein is the flow and pace of speech. The natural flow and pace of a user's speech can be analyzed to find patterns or irregularities in the speed of speech, which can sometimes indicate stress, uncertainty, or scripting, which are common in spoofing attacks. Unusual pauses or changes in the rhythm of speech, such as hesitations or rushed sequences, might suggest that the speaker is not genuine or is following a premeditated script.

Natural speech involves variations in pitch. The variations in pitch are assessed to determine if they fit the normal speech patterns of the user or if they seem unnatural or monotone, as might be the case with synthetic voices. Intonation is closely tied to emotional expression. Changes in intonation based on the conversational context facilitates identifying if the voice lacks the emotional depth or variability expected in genuine human speech.

The time taken by a user to respond to prompts or questions during, for example, an authentication transaction can also be evaluated. An unusually fast response or a consistent delay might indicate a synthetic interaction or a person following a script. Analyzing the duration of spoken phrases can reveal information that may facilitate determining whether data is fraudulent. For example, unusually short or long durations, or a lack of variability in durations, might be characteristic of artificial speech generation.

The patterns in rhythm, intonation, and timing are compared against established user data or general models of genuine human interaction. Deviations from these models can trigger alerts 58 or additional verification processes, thereby enhancing the accuracy and trustworthiness of authentication transaction results.

Circumstances of an authentication transaction refer to the various contextual factors and environmental conditions during the authentication transaction. Analyzing circumstances of the transaction facilitates determining the legitimacy of the authentication transaction by providing a broader picture of the interaction in addition to the captured voice biometric data. Circumstances of authentication transactions include, but are not limited to, location data, time of the transaction, device information, network and connection security, transaction history, and user interactions.

The geographical location from which an authentication request is being made may be analyzed to check the Internet Protocol (IP) address of the user, Global Positioning Data (GPS) data of the user if available, or any location-based services. Locations that do not comport with or are inconsistent with established behavioral patterns of the user may indicate that further analysis of the captured voice biometric data is necessary.

Authentication transactions occurring at unusual hours, for example, in the middle of the night and especially transactions deviating from established transaction patterns of the user, can be identified as requiring additional automatic review or manual review.

Device information can include any information about the device used for conducting the remote authentication transaction. Such information includes, but is not limited to, the type of device, the operating system running the device, the mobile operating system and type, and whether the information matches corresponding record information of the user. An authentication transaction conducted or requested to be conducted from a device that does not match the records of the user may indicate the transaction is fraudulent and thus requires additional scrutiny.

The network used to conduct an authentication transaction may be assessed to determine whether the transaction is being conducted from a network different from that typically used by a user. Different networks can include, for example, insecure networks, public networks, or networks having a different network signature than normally associated with the user. A different network may indicate the transaction is fraudulent and thus requires additional scrutiny.

The history of authentication transactions for each user can be stored in his or her data record. The history may include, but is not limited to, the frequency, size, and type of authentication transactions usually conducted by the user. Data captured during an authentication transaction that includes anomalies or deviations from corresponding record data of the user may be identified for further analysis.

Users enter and capture data via, for example, the electronic device 10 during authentication transactions. Rapid entry and/or capture of data or inconsistent navigation through the authentication process may be unusual and warrant further investigation.

Circumstances of an authentication transaction are analyzed using various data points. The data points may be compared against corresponding information in the data record of the user or expected patterns of user behavior. If the analysis reveals inconsistencies or anomalies, the analysis can be included in the calculation of a risk score, thus influencing any alerts or additional verification steps to be taken. Considering the context of the transaction in addition to the voice biometric data captured during the transaction enhances the accuracy and trustworthiness of authentication transaction results.

Mannerisms of a user refer to the distinctive behaviors, patterns, and characteristics displayed by the user during authentication transactions. Mannerisms of a user can be used to verify the identity of the user and detect potentially fraudulent activity. Mannerisms include, but are not limited to, voice characteristics, speech patterns and habits, emotional tone and stress levels, interaction behavior, background sounds and acoustic environment and patterns in rhythm of speech, intonation of speech, and timing of speech.

Voice characteristics include, but are not limited to, pitch, tone, speed, and volume, Voice characteristics for each user are different, Changes or irregularities in these voice characteristics, compared to the user's typical voice profile created from data stored in his or her data record, may indicate fraud is being perpetuated or that identity information of the user is being stolen.

Speech patterns include, but are not limited to, the use of certain phrases by a user, habitual filler words of a user, or specific pronunciations of a user. Differences between known speech patterns of a user and the speech patterns of captured voice biometric data may indicate that the captured voice biometric data does not belong to the legitimate user.

The emotional tone and stress levels in captured voice biometric data may indicate the user is under stress or is nervous. Stress levels, especially in contexts where they are unexpected, may indicate that fraud is being perpetuated.

Interaction behavior includes data regarding how a user behaves during authentication transactions. Examples of interaction behavior include, but are not limited to, user response times, how a user navigates through menus, and the typical transaction behavior of a user. An abrupt change in one or more interaction behavior may indicate that fraud is being perpetuated by a person other than the legitimate user.

The acoustic environment during authentication transactions may be analyzed, for example, by analyzing captured voice biometric data for background noises or sounds that are atypical for the environments associated with the user. Additionally, the background noises or sounds can be compared against a database of background noises. If the background noise in captured voice biometric data matches the background noise from an attempted or successful fraudulent transaction, the captured voice biometric data may be fraudulent. Additionally, such a comparison facilitates categorizing the background noise.

Mannerisms are analyzed to recognize patterns and anomalies, and to recognize differences in user behavior during authentication transactions. Mannerisms may be analyzed by assessing any one mannerism or any combination of mannerisms. For example, mannerisms may be analyzed by assessing captured voice biometric data of a user for rhythms, intonations, and timing.

By comparing mannerisms extracted from data captured during an authentication transaction against a behavioral profile of the user, inconsistencies may be detected that may indicate fraud is being perpetuated. If such inconsistencies are detected, the inconsistencies are used in calculating a risk score for the transaction which may trigger an alert or require implementing additional security measures. Thus, analyzing data captured during an authentication transaction for user mannerisms facilitates enhancing the accuracy and trustworthiness of authentication transaction results.

The content of conversations may also be analyzed to detect fraudulent voice biometric data. By analyzing the record voice biometric data of a user typical vocabulary and phrasing of the user can be determined. The sentence structure of voice biometric data captured during an authentication transaction may be compared against the typical vocabulary and phrasing of the user to detect differences in language that may indicate the captured voice biometric data was synthetically created or created via scripted interaction.

The record voice biometric data of a user may also be analyzed to assess the timing of responses by the user, the flow of any conversations involving the user, any unusual pauses or interruptions of the user, and the typical sequence of interactions of the user during an authentication transaction. Voice biometric data captured during an authentication transaction may be analyzed to assess these same features and can be compared against the corresponding known features of the user to detect any differences that may indicate the captured voice biometric data is fraudulent.

Speech deflections and subtle voice modulations may infer the emotional state of the user from whom voice biometric data was captured. Sudden changes in emotional tone not aligned with the context of the authentication transaction may indicate that the captured voice biometric data is fraudulent.

A prediction may be generated for each authentication transaction that predicts the likelihood that the authentication transaction is fraudulent. The prediction is generated using factors such as but not limited to, the similarity of interaction patterns to known fraudulent transactions and the presence of anomalies in the captured voice biometric data or behavior. The results of predictions, for example, confirmed instances of fraud, may be used for retraining the machine learning model to enhance the model's robustness and accuracy over time. Typically, the predictions are generated and analyzed automatically by the electronic device 10. However, when, for example, a prediction is not conclusive manual review may be conducted to provide insight into the prediction.

It is contemplated by the present disclosure that the machine learning model may be retrained using captured voice biometric data and other data captured during authentication transactions. Other data may include user interaction data and user responses associated with fraudulent authentication transactions. It should be understood that training facilitates incorporating changes in user behavior over time. By virtue of collecting data of the user over time, any changes in behavior of the user will automatically be accounted for during retraining. The additional training enhances the machine learning model's effectiveness in detecting the most recently developed security threats to thus enhance the accuracy and trustworthiness of generated results. The additional training may be periodic, for example, every month or two. Alternatively, the training may be more frequent, for example, once a day or once a week.

A risk score may be calculated for each authentication transaction using factors including, but not limited to, the following: a biometric authentication result; identified patterns and anomalies that match known fraudulent behavior or deviate from normal behavior of a user; speech pattern analysis; emotional and sentiment analysis; and, interaction pattern recognition. A user's historical interaction data, including past behaviors, frequency of certain actions, and previous security incidents may also be used for calculating the risk score. Moreover, the context in which the interaction occurs may be used to calculate the risk score. Context includes, but is not limited to the time of day, the transaction's nature, and any external factors that might influence the user's behavior. Past incidents of fraud, preferred interaction channels, and typical transaction sizes may also be used to calculate the risk score. The risk score may be used to determine a risk level for the authentication transaction and to determine an alert corresponding to the risk level.

FIG. 4 is a diagram 50 illustrating example risk scores 52 and corresponding example risk levels 54. More specifically, the risk scores 52 are divided into three ranges, 0.00 to 0.33, 0.34 to 0.66, and 0.67 to 1.00. There are three example risk levels 54, low, medium and high. Risk levels 54 are categorical representations of potential security threat severity as determined by the risk score 52. Each risk level is associated with a range of risk scores and reflects the urgency and potential impact of the perceived security threat. The low, medium, and high risk levels correspond to the risk score ranges of 0.00 to 0.33, 0.34 to 0.66, and 0.67 to 1.00, respectively.

It is contemplated by the present disclosure that the risk scores may be divided into any number of different ranges, and that the ranges may be different than described herein. Moreover, the risk levels may be the same or different and can be designed to correspond to any change in the risk score changes. A same risk level may correspond to different risk scores and/or risk score ranges.

Risk scores ranging from 0.00 to 0.33 typically indicate that the captured voice biometric data is authentic. As a result, captured voice biometric data having a risk score between 0.00 and 0.33 is considered to have a low risk of being fraudulent. A low risk level 54 can indicate, for example, that there may be minor discrepancies or anomalies in captured voice biometric data that does not warrant a manual or automatic review. The data may be stored for training the machine learning model.

Risk scores ranging from 0.34 to 0.66 may be assigned to captured voice biometric data having a medium risk of being fraudulent. The medium risk level 54 indicates that unusual patterns detected in captured voice biometric data are not necessarily fraudulent but exhibit atypical characteristics that cause it to be outside of standard automated processing criteria. Captured voice biometric data assigned a medium risk level 54 may require, for example, a more thorough automated review or a low priority manual review to confirm the authenticity of the captured voice biometric data.

Risk scores ranging from 0.67 to 1.00 may be assigned to captured voice biometric data having a high risk of being fraudulent. A high risk level 54 typically indicates that there is strong possibility that the captured voice biometric data may be fraudulent. Captured voice biometric data assigned a high risk level 54 may require initiating automatic security protocols such as, but not limited to, blocking a transaction desired to be conducted by a user, alerting security personal, and identifying the account for further investigation. Further investigation may include determining where, when and by whom the captured voice biometric data was made.

Alerts based on the risk level 54 may be generated for voice biometric data captured during an authentication transaction.

FIG. 5 is a diagram 56 illustrating the correspondence between risk levels 54 and example alerts 58. There are three alerts 58, each corresponding to a different risk level 54. Alerts 58 are generated based on the corresponding risk level range. An alert 58 indicates that voice biometric data captured during an authentication transaction or other data associated with the transaction requires attention or intervention. The type and severity of alert 58 correlates with the risk level 54.

For low risk levels 54 an alert 58 is not issued. Rather, the event may be stored for use in retraining the machine learning model. For medium levels of risk, an alert 58 may be issued that instructs the electronic device 10 to automatically conduct a more detailed analysis of the captured voice biometric data or indicates that security personnel are to conduct a low level manual review of the captured voice biometric data.

A high risk level 54 typically indicates that there is a strong possibility that the captured voice audio data is fraudulent. Thus, for high risk levels 54, an alert 58 is issued that may require immediately initiating automatic security protocols such as, but not limited to, temporarily suspending a transaction desired to be conducted by a user, conducting a manual review of the captured voice audio data, automatically starting security protocols, and identifying the data for further investigation. Further investigation may include determining where, when and by whom the captured voice audio data was made.

Alerts may be issued, for example, by displaying a message, emitting a noise, speaking a warning, vibrating, or any combination thereof. The alert may be implemented by the electronic device 10 or any other electronic device or computer in the system 100.

It should be understood that many alerts may be pending simultaneously. By virtue of prioritizing the alerts 58 according to risk level, the higher risk authentication transactions are resolved quickly while lower risks are monitored and/or reviewed according to their severity. Thus, an efficient allocation of security resources is facilitated to be enhanced.

Interaction sequences as described herein refer to the specific order and manner in which a user behaves during a transaction, for example, while using an automated teller machine (ATM). While using an ATM one user may regularly check his or her account balance before conducting a transaction while another user may regularly check after conducting the transaction. There is also a temporal aspect to interaction sequences which is the timing between actions taken by the user. For example, the time a user typically spends reviewing information before making a decision or moving to the next step in the interaction, Interactions may occur regularly, for example, the habitual use of specific features or services at certain times. Anomalies in these regular occurrences, like accessing services at unusual times or in an unusual order, can be indicative of fraudulent activity. Interaction sequences also include how a user responds to prompts or navigates through menu options. Users typically develop patterns in how they navigate menus, respond to prompts, or input information.

Interaction sequences can also involve more complex behavioral patterns, such as the tendency to ask for help, repeat certain actions, or exhibit specific speech patterns when confused or looking for specific information. Anomalies or deviations from established interaction sequences can be strong indicators of potential fraud or identity theft, prompting the appropriate action to be taken, such as generating alerts 58 or initiating additional verification steps. Interaction sequences may be assessed to analyze the mannerisms of a user.

The electronic device 10 may dynamically adjust the relationship between risk scores 52, risk levels 54 and alerts 58 based on retraining the machine learning model. As the model is retrained with additional data, new patterns are recognized which causes the electronic device 10 to refine the risk scores 52, adjust the thresholds defining the risk levels 54, and adjust the alerts 58 accordingly. Additionally, or alternatively, the correspondence between the alerts 58 and the risk levels 54 may be updated based on an analysis of data in the memory 18. Such data includes, but is not limited to, captured voice biometric data, the result of voice biometric data analyses, the results of circumstance analyses, and the results of mannerism analyses.

Voice watchlist systems have been used in identifying and mitigating risks associated with unauthorized voice access or fraudulent activities. Voice watchlist systems typically maintain a repository of user voice data. These systems generally compare identity data and voice data captured during an authentication transaction against the corresponding data in the repository to flag potential mismatches, or efforts to deceive an authenticating entity into concluding that a malicious actor is the person they claim to be. Such impersonations are known as spoofing.

However, the effectiveness of known systems is waning because they are designed to identify and respond to known threats and generally are unable to adapt to the nuanced and evolving nature of synthetic voice and identity fraud. Moreover, such systems may not adequately analyze behavioral patterns associated with voice interactions and thus do not capture clues that could indicate fraudulent activity. Furthermore, such known systems may struggle to scale effectively given the proliferation of digital communications platforms which could cause lapses in monitoring and delayed processing times. As a result, the costs incurred due to spoofing attacks are rapidly increasing.

To address these problems the electronic device 10 may analyze user voice biometric data captured while the user was speaking to determine whether the captured voice biometric data exhibits anomalies associated with fraudulent voice biometric data. The electronic device 10 can also analyze circumstances under which the voice biometric data was captured, analyze mannerisms of the user while the voice biometric date was captured, and calculate a risk score based on at least the results of the analyses. Moreover, the electronic device 10 can compare the risk score against a threshold value, and in response to determining the risk score fails to satisfy the threshold value, the electronic device 10 can generate an alert having a risk level corresponding to the risk score.

Figure 6:
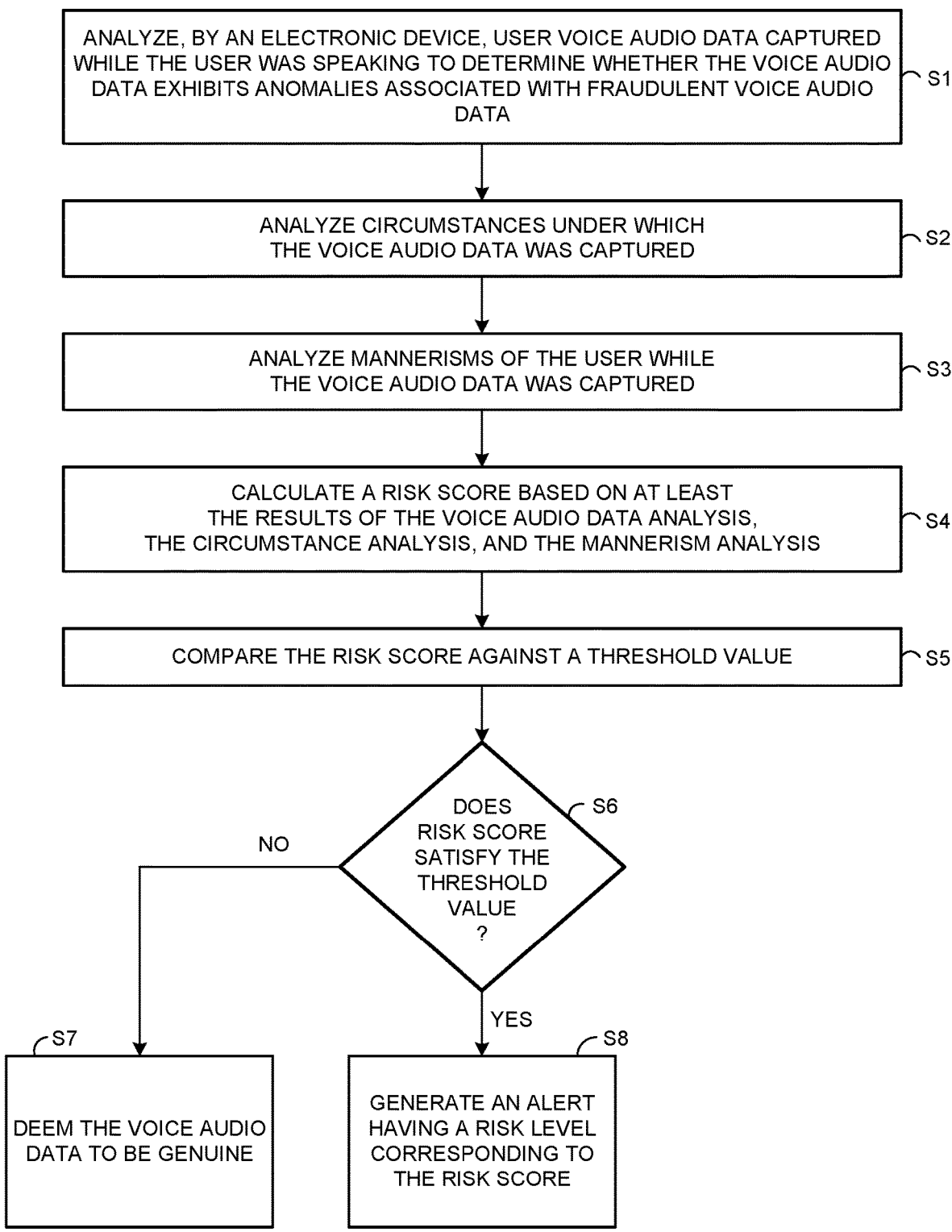
FIG. 6 is a diagram illustrating an example method and algorithm for enhancing detection of fraudulent data according to an embodiment of the present disclosure.

FIG. 6 is a diagram illustrating an example method and algorithm for enhancing detection of fraudulent data according to an embodiment of the present disclosure. A user may be required to authenticate his or her identity before being permitted to conduct, using the electronic device 10, a desired network-based transaction. Such network-based transactions include, but are not limited to, buying merchandise from a merchant service provider website, accessing top secret information from a computer system, or opening an account at a financial institution. Detecting fraudulent voice biometric data would facilitate reducing fraud and the related inconvenience and costs. FIG. 6 illustrates example steps performed when the electronic device 10 runs software 38 stored in the memory 18 to enhance detection of fraudulent voice biometric data.

In step S1, the software 38 executed by the processor 16 causes the electronic device 10 to analyze user voice audio data captured while the user was speaking to determine whether the voice audio data exhibits anomalies associated with fraudulent voice audio data. Examples of anomalies include, but are not limited to, accessing services at unusual times or in an unusual order.

In step S2, the software 38 executed by the processor 16 causes the electronic device 10 to analyze circumstances under which the voice audio data was captured. Circumstances of an authentication transaction refer to the various contextual factors and environmental conditions during the authentication transaction. Analyzing circumstances of the transaction facilitates determining the legitimacy of the authentication transaction by providing a broader picture of the interaction in addition to the captured voice biometric data. Circumstances of authentication transactions include, but are not limited to, location data, time of the transaction, device information, network and connection security, transaction history, and user interactions.

Mannerisms are analyzed to recognize patterns and anomalies, and to recognize differences in user behavior during authentication transactions. By comparing mannerisms extracted from data captured during an authentication transaction against a behavioral profile of the user, inconsistencies may be detected that may indicate fraud is being perpetuated. If such inconsistencies are detected, the inconsistencies are used in calculating a risk score for the transaction which may trigger an alert or require implementing additional security measures. Thus, analyzing data captured during an authentication transaction for user mannerisms facilitates enhancing the accuracy and trustworthiness of authentication transaction results.

In step S3, the software 38 executed by the processor 16 causes the electronic device 10 to analyze mannerisms of the user while the voice audio date was captured. Mannerisms of a user refer to the distinctive behaviors, patterns, and characteristics displayed by the user during authentication transactions. Mannerisms of a user can be used to verify the identity of the user and detect potentially fraudulent activity. Mannerisms include, but are not limited to, voice characteristics, speech patterns and habits, emotional tone and stress levels, interaction behavior, and background sounds and acoustic environment.

In step S4, the software 38 executed by the processor 16 causes the electronic device 10 to calculate a risk score based on at least the results of the voice audio data analysis, the circumstance analysis, and the mannerism analysis. Next, in step S5, the software 38 executed by the processor 16 causes the electronic device 10 to compare the risk score against a threshold value, and in step S6, to determine whether the risk score satisfies the threshold value.

Each risk score may satisfy the threshold value when the respective risk score is equal to or greater than the threshold value, greater than the threshold value, less than the threshold value, or less than or equal to the threshold value. The threshold value may alternatively include multiple threshold values, each of which is required to be satisfied by a respective risk score to satisfy the threshold value. The threshold value may be dynamically adjusted based on historical data trends, anomaly detection accuracy, and user feedback.

When the risk score fails to satisfy the threshold value, in step S7, the software 38 executed by the processor 16 causes the electronic device 10 to deem the voice audio data is fraudulent and to generate an alert 58 having a risk level corresponding to the risk score. Issuing an alert includes, but is not limited to, displaying a message, emitting a noise, speaking a warning, vibrating or any combination thereof. The alert may be implemented by the electronic device 10 or any other electronic device or computer in the system 100.

However, when the risk score satisfies the threshold value, in step S8, the software 38 executed by the processor 16 causes the electronic device 10 to deem the voice audio data is genuine.

Using the methods and algorithms for enhancing detection of fraudulent voice audio data as described herein enables quickly determining whether voice audio data captured during an authentication transaction may be fraudulent using a machine learning model capable of adapting to the nuanced and evolving nature of synthetic voice and identity fraud, analyzing behavioral patterns associated with voice interactions, and scaling effectively to accommodate the proliferation of digital communications. As a result, the methods and algorithms facilitate enhancing a reduction in risks associated with conducting different kinds of network-based transactions while enhancing security against spoofing attacks and facilitating a reduction in costs incurred due to successful spoofing attacks as well as the inconvenience experienced by users that are victims of successful spoofing attacks.

It is contemplated by the present disclosure that the example methods and algorithms described herein may be implemented as one or more machine learning models that may be periodically retrained with data captured during authentication transactions of the same or different users. Doing so facilitates adapting the example methods and algorithms described herein to evolving spoofing techniques which further facilitates the reduction of risks associated with conducting network-based transactions. The machine learning models may be retrained after any period of time, for example, every three to six months.

It is contemplated by the present disclosure that the example methods and algorithms described herein may be conducted entirely by the electronic device 10; partly by the electronic device 10 and partly by the server 12; entirely by the server 12, or by any other combination of other servers (not shown), electronic devices (not shown), or computers (not shown) operable to communicate with the electronic device 10 and the server 12 via the network 14. Furthermore, data described herein as being stored in the electronic device 10 may alternatively, or additionally, be stored in the server 12 or any other server (not shown), electronic device (not shown), or computer (not shown) operable to communicate with the electronic device 10 via the network 14.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. For any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for enhancing detection of fraudulent data comprising the steps of:

analyzing, by an electronic device running a machine learning model, environmental conditions and contextual factors under which voice biometric data was captured while a user was speaking during an authentication transaction, the captured voice biometric data for habitual filler words of the user and certain words used by the user, interaction behavior of the user during the authentication transaction, the captured voice biometric data for intonation of speech of the user, and the captured voice biometric data for the timing of speech of the user during the authentication transaction, wherein the contextual factors include location data, time of the authentication transaction, information about the electronic device, network and connection security, transaction history, and user interactions;

storing the captured voice biometric data, the environmental conditions, the contextual factors, and the time taken by the user to respond to prompts or questions during the authentication transaction in a decentralized database employing blockchain technology;

comparing result of said analyzing step against corresponding record data of the user to determine anomalies therebetween that may indicate the captured voice biometric data is fraudulent;

calculating a risk score based on the anomalies:

comparing the risk score against a threshold value;

in response to determining the risk score fails to satisfy the threshold value, determining a risk level for the risk score and generating an alert for the risk level, wherein the risk level reflects the urgency and potential impact of a perceived security threat;

calculating a risk score for each of a plurality of other authentication transactions;

determining a risk level for each calculated risk score and generating an alert for each risk level;

prioritizing the alerts based on the risk levels;

allocating security resources according to said prioritizing step;

analyzing the data stored in said storing step;

updating a correspondence between the generated alerts and risk scores based on the analysis of the stored data; and updating the machine learning model using data from authentication transactions conducted with the user and different users.

2. The method according to claim 1 further comprising:

analyzing the captured voice biometric data for background noise; and categorizing the background noise.

3. The method according to claim 1 further comprising dynamically adjusting the threshold value based on historical data trends, anomaly detection accuracy, and user feedback.

4. An electronic device for enhancing detection of fraudulent data comprising:

a processor; and a memory configured to store data, said electronic device being associated with a network and said memory being in communication with said processor and having instructions stored thereon which, when read and executed by said processor, cause said electronic device to:

analyze environmental conditions and contextual factors under which voice biometric data was captured while a user was speaking during an authentication transaction, the captured voice biometric data for habitual filler words of the user and certain words used by the user, interaction behavior of the user during the authentication transaction, the captured voice biometric data for intonation of speech of the user, and the captured voice biometric data for the timing of speech of the user during the authentication transaction, wherein the contextual factors include location data, time of the authentication transaction, information about the electronic device, network and connection security, transaction history, and user interactions;

store the captured voice biometric data, the environmental conditions, the contextual factors, and time taken by the user to respond to prompts or questions during the authentication transaction in a decentralized database employing blockchain technology;

compare the analysis results against corresponding record data of the user to determine anomalies therebetween that may indicate the captured voice biometric data is fraudulent;

calculate a risk score based on the anomalies;

compare the risk score against a threshold value;

when the risk score fails to satisfy the threshold value, determine a risk level for the risk score and generate an alert for the risk level, wherein the risk level reflects the urgency and potential impact of a perceived security threat;

calculate a risk score for each of a plurality of other authentication transactions;

determine a risk level for each calculated risk score and generate an alert for each risk level;

prioritize the alerts based on the risk levels;

allocate security resources according to the prioritization;

analyze the stored data;

update a correspondence between the generated alerts and risk scores based on the analysis of the stored data; and update the machine learning model using data from authentication transactions conducted with the user and different users.

5. The electronic device according to claim 4, wherein the instructions when read and executed by said processor, further cause said electronic device to:

analyze the captured voice biometric data for background noise; and categorize the background noise.

6. The electronic device according to claim 4, wherein the instructions when read and executed by said processor, further cause said electronic device to dynamically adjust the threshold value based on historical data trends anomaly detection accuracy, and user feedback.

\* \* \* \* \*